United States Patent
Koskela et al.

(10) Patent No.: US 9,883,484 B2
(45) Date of Patent: Jan. 30, 2018

(54) METHOD AND APPARATUS THAT USES MULTIPLE NETWORK-SIGNALING VALUES

(71) Applicant: Nokia Technologies Oy, Espoo (FI)

(72) Inventors: Jarkko Koskela, Oulu (FI); Antti Piipponen, Vantaa (FI); Petri Vasenkari, Turku (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 59 days.

(21) Appl. No.: 14/888,680

(22) PCT Filed: Apr. 8, 2014

(86) PCT No.: PCT/FI2014/050253
§ 371 (c)(1),
(2) Date: Nov. 2, 2015

(87) PCT Pub. No.: WO2014/188053
PCT Pub. Date: Nov. 27, 2014

(65) Prior Publication Data
US 2016/0066299 A1    Mar. 3, 2016

Related U.S. Application Data

(60) Provisional application No. 61/825,379, filed on May 20, 2013.

(51) Int. Cl.
*H04W 72/00*    (2009.01)
*H04W 48/12*    (2009.01)
(Continued)

(52) U.S. Cl.
CPC ......... *H04W 72/005* (2013.01); *H04L 5/0092* (2013.01); *H04W 48/12* (2013.01); *H04W 52/30* (2013.01); *H04W 52/367* (2013.01)

(58) Field of Classification Search
None
See application file for complete search history.

(56) References Cited

U.S. PATENT DOCUMENTS 9,294,910 B2 *  3/2016  Bergljung .............. H04W 8/24
2011/0319119 A1  12/2011  Ishii
(Continued)

FOREIGN PATENT DOCUMENTS

WO    2012/173057 A1    12/2012
WO    2013/048198 A1    4/2013

OTHER PUBLICATIONS

"Band 13 operation and N5_07", 3GPP TSG-RAN Working Group (Radio) 4 meeting #64, R4-124501, Agenda: 6.1.1—UE RF (core), Nokia Corporation, Aug. 13-17, 2012, 7 pages.
(Continued)

*Primary Examiner* — Diane Lo
(74) *Attorney, Agent, or Firm* — Squire Patton Boggs (US) LLP (57) ABSTRACT

A method and apparatus can be configured to transmit broadcast system information to a user equipment. The broadcast system information can comprise a frequency band indicator that is used for a plurality of instances. Each instance of the plurality of instances can correspond to a separate network-signaling value.

20 Claims, 5 Drawing Sheets

Table 6.2.4-1: Additional Maximum Power Reduction (A-MPR)

| Network Signalling value | Requirements (subclause) | E-UTRA Band | Channel bandwidth (MHz) | Resources Blocks ($N_{RB}$) | A-MPR (dB) | Version |
|---|---|---|---|---|---|---|
| NS_01 | 6.6.2.1.1 | Table 5.5-1 | 1.4, 3, 5, 10, 15, 20 | Table 5.6-1 | NA | |
| NS_03 | 6.6.2.2.1 | 2, 4, 10, 23, 25, 35, 36 | 3 | >5 | ≤1 | |
| | | | 5 | >6 | ≤1 | |
| | | | 10 | >6 | ≤1 | |
| | | | 15 | >8 | ≤1 | |
| | | | 20 | >10 | ≤1 | |
| NS_04 | 6.6.2.2.2 | 41 | 5 | >6 | ≤1 | |
| | | | 10, 15, 20 | Table 6.2.4-4 | | |
| NS_05 | 6.6.3.3.1 | 1 | 10,15,20 | ≥ 50 | ≤1 | |
| NS_06 | 6.6.2.2.3 | 12, 13, 14, 17 | 1.4, 3, 5, 10 | Table 5.8-1 | n/a | |
| NS_07 | 6.6.2.2.3 | 13 | 10 | Table 6.2.4-2 | Table 6.2.4-2 | 1 |
| | 6.6.3.3.2 | 13 | 5, 10 | Table 6.2.4-2a | Table 6.2.4-2a | 2 |
| NS_08 | 6.6.3.3.3 | 19 | 10, 15 | > 44 | ≤ 3 | |
| NS_09 | 6.6.3.3.4 | 21 | 10, 15 | > 40 | ≤ 1 | |
| | | | | > 55 | ≤ 2 | |
| NS_10 | | | 20 | 15, 20 | Table 6.2.4-3 | Table 6.2.4-3 |
| NS_11 | 6.6.2.2.1 | 23 | 1.4, 3, 5, 10, 15, 20 | Table 6.2.4-5 | Table 6.2.4-5 | |
| ... | | | | | | |
| NS_20 | 6.2.2 6.6.2.2.1 6.6.3.2 | 23 | 5, 10, 15, 20 | Table 6.2.4-6 | Table 6.2.4-6 | |
| ... | | | | | | |
| NS_32 | - | - | - | - | - | |

(51) Int. Cl.
*H04L 5/00* (2006.01)
*H04W 52/30* (2009.01)
*H04W 52/36* (2009.01)

(56) References Cited

U.S. PATENT DOCUMENTS

| | | | |
|---|---|---|---|
| 2012/0058772 | A1 | 3/2012 | Kazmi et al. |
| 2012/0202487 | A1 | 8/2012 | Kazmi et al. |
| 2013/0053103 | A1 | 2/2013 | Kim et al. |
| 2013/0182663 | A1* | 7/2013 | Ji ............... H04W 72/0473 370/329 |
| 2014/0248889 | A1* | 9/2014 | Van Lieshout ... H04W 36/0083 455/450 |

OTHER PUBLICATIONS

"Way Forward on MPR and release independent operating band specifications", 3GPP TSG-RAN Working Group 4 (Radio) meeting #66 bis, R4-131561, Agenda: 5.10, Nokia Corporation, Apr. 15-19, 2013, 6 pages.

"3rd Generation Partnership Project;Technical Specification Group Radio Access Network;Evolved Universal Terrestrial Radio Access (E-UTRA);User Equipment (UE) radio transmission and reception(Release 11)", 3GPP TS 36.101, V11.4.0, Mar. 2013, pp. 1-401.

"3rd Generation Partnership Project;Technical Specification Group Radio Access Network;Evolved Universal Terrestrial Radio Access (E-UTRA);Radio Resource Control (RRC);Protocol specification(Release 11)", 3GPP TS 36.331, V11.3.0, Mar. 2013, pp. 1-344.

"3rd Generation Partnership Project;Technical Specification Group Radio Access Network;Radio Resource Control (RRC);Protocol specification(Release 11)", 3GPP TS 25.331, V11.5.0, Mar. 2013.

Extended European Search Report received for corresponding European Patent Application No. 14801672.8, dated Nov. 28, 2016, 7 pages.

"Enhancement of additional emission requirement handling", 3GPP TSG-RAN Working Group 4 meeting #60 bis, R4-115256, Agenda: 6.1.1, Samsung, Nov. 14-18, 2011, 3 pages.

European Patent Office, Office Action corresponding to Appln. No. 14 801 672.8, dated Nov. 6, 2017.

* cited by examiner

Table 6.2.4-1: Additional Maximum Power Reduction (A-MPR)

| Network Signalling value | Requirements (subclause) | E-UTRA Band | Channel bandwidth (MHz) | Resources Blocks ($N_{RB}$) | A-MPR (dB) | Version |
|---|---|---|---|---|---|---|
| NS_01 | 6.6.2.1.1 | Table 5.5-1 | 1.4, 3, 5, 10, 15, 20 | Table 5.6-1 | NA | |
| NS_03 | 6.6.2.2.1 | 2, 4, 10, 23, 25, 35, 36 | 3 | >5 | ≤ 1 | |
| | | | 5 | >6 | ≤ 1 | |
| | | | 10 | >6 | ≤ 1 | |
| | | | 15 | >8 | ≤ 1 | |
| | | | 20 | >10 | ≤ 1 | |
| NS_04 | 6.6.2.2.2 | 41 | 5 | >6 | ≤ 1 | |
| | | | 10, 15, 20 | Table 6.2.4-4 | | |
| NS_05 | 6.6.3.3.1 | 1 | 10, 15, 20 | ≥ 50 | ≤ 1 | |
| NS_06 | 6.6.2.2.3 | 12, 13, 14, 17 | 1.4, 3, 5, 10 | Table 5.6-1 | n/a | |
| NS_07 | 6.6.2.2.3 | 13 | 10 | Table 6.2.4-2 | Table 6.2.4-2 | 1 |
| | 6.6.3.3.2 | 13 | 5, 10 | Table 6.2.4-2a | Table 6.2.4-2a | 2 |
| NS_08 | 6.6.3.3.3 | 19 | 10, 15 | > 44 | ≤ 3 | |
| NS_09 | 6.6.3.3.4 | 21 | 10, 15 | > 40 | ≤ 1 | |
| | | | | > 55 | ≤ 2 | |
| NS_10 | | 20 | 15, 20 | Table 6.2.4-3 | Table 6.2.4-3 | |
| NS_11 | 6.6.2.2.1 | 23 | 1.4, 3, 5, 10, 15, 20 | Table 6.2.4-5 | Table 6.2.4-5 | |
| .. | | | | | | |
| NS_20 | 6.2.2 6.6.2.2.1 6.6.3.2 | 23 | 5, 10, 15, 20 | Table 6.2.4-6 | Table 6.2.4-6 | |
| .. | | | | | | |
| NS_32 | - | - | - | - | - | |

METHOD AND APPARATUS THAT USES MULTIPLE NETWORK-SIGNALING VALUES

RELATED APPLICATION

This application was originally filed as PCT Application No. PCT/FI2014/050253 filed Apr. 8, 2014, which claims priority benefit from U.S. Provisional Application No. 61/825,379, filed May 20, 2013.

BACKGROUND

Field

Embodiments of the invention relate to using multiple network-signaling (NS) values.

Description of the Related Art

Long-term Evolution (LTE) is a standard for wireless communication that seeks to provide improved speed and capacity for wireless communications by using new modulation/signal processing techniques. The standard was proposed by the $3^{rd}$ Generation Partnership Project (3GPP), and is based upon previous network technologies. Since its inception, LTE has seen extensive deployment in a wide variety of contexts involving the communication of data.

SUMMARY

According to a first embodiment, a method includes transmitting broadcast system information to a user equipment. The broadcast system information includes a frequency band indicator that is used for a plurality of instances. Each instance of the plurality of instances corresponds to a separate network-signaling value.

In the method of the first embodiment, each network-signaling value corresponds to a different requirement in emissions and/or an additional maximum power reduction.

In the method of the first embodiment, the method may further include receiving an indication from the user equipment that the user equipment supports a network-signaling value.

In the method of the first embodiment, the transmitting includes using a system information block to transmit the broadcast system information.

According to a second embodiment, an apparatus includes at least one processor. The apparatus includes at least one memory including computer program code. The at least one memory and the computer program code may be configured, with the at least one processor, to cause the apparatus at least to transmit broadcast system information to a user equipment. The broadcast system information includes a frequency band indicator that is used for a plurality of instances. Each instance of the plurality of instances corresponds to a separate network-signaling value.

In the apparatus of the second embodiment, each network-signaling value corresponds to a different requirement in emissions and/or an additional maximum power reduction.

In the apparatus of the second embodiment, the apparatus may also be caused to receive an indication from the user equipment that the user equipment supports a network-signaling value.

In the apparatus of the second embodiment, the transmitting includes using a system information block to transmit the broadcast system information.

According to a third embodiment, a computer program product may be embodied on a non-transitory computer readable medium. The computer program product may be configured to control a processor to perform a process including transmitting broadcast system information to a user equipment. The broadcast system information includes a frequency band indicator that is used for a plurality of instances. Each instance of the plurality of instances corresponds to a separate network-signaling value.

According to a fourth embodiment, a method includes receiving, by a user equipment, broadcast system information. The broadcast system information includes a frequency band indicator that is used for a plurality of instances. Each instance of the plurality of instances corresponds to a separate network-signaling value.

In the method of the fourth embodiment, each network-signaling value corresponds to a different requirement in emissions and/or an additional maximum power reduction.

In the method of the fourth embodiment, the method may further include choosing a network-signaling value.

In the method of the fourth embodiment, receiving broadcast system information includes receiving broadcast system information transmitted by a system information block.

In the method of the fourth embodiment, choosing a network-signaling value may include choosing the network-signaling value that has the highest value.

In the method of the fourth embodiment, the method may also include transmitting, by the user equipment, an indication that the user equipment supports a network-signaling value.

According to a fifth embodiment, an apparatus includes at least one processor. The apparatus also includes at least one memory including computer program code. The at least one memory and the computer program code may be configured, with the at least one processor, to cause the apparatus at least to receive, by a user equipment, broadcast system information. The broadcast system information includes a frequency band indicator that is used for a plurality of instances. Each instance of the plurality of instances corresponds to a separate network-signaling value.

In the apparatus of the fifth embodiment, each network-signaling value corresponds to a different emission requirement in emissions and/or an additional maximum power reduction.

In the apparatus of the fifth embodiment, the apparatus may also be caused to choose a network-signaling value.

In the apparatus of the fifth embodiment, receiving broadcast system information includes receiving broadcast system information transmitted by a system information block.

In the apparatus of the fifth embodiment, choosing a network-signaling value may include choosing the network-signaling value that has the highest value.

In the apparatus of the fifth embodiment, the apparatus may be further caused to transmit an indication that the user equipment supports a network-signaling value.

According to a sixth embodiment, a computer program product may be embodied on a non-transitory computer readable medium. The computer program product may be configured to control a processor to perform a process including receiving, by a user equipment, broadcast system information. The broadcast system information includes a frequency band indicator that is used for a plurality of instances. Each instance of the plurality of instances corresponds to a separate network-signaling value.

BRIEF DESCRIPTION OF THE DRAWINGS

For proper understanding of the invention, reference should be made to the accompanying drawings, wherein.

DETAILED DESCRIPTION

One embodiment of the present invention relates to 3GPP LTE technologies. Specifically, one embodiment is directed to specifications of frequency bands that are configured independent of 3GPP releases. Another embodiment is directed to the protection of adjacent services using network signaling (NS) values.

Once an Evolved Universal Terrestrial Radio Access (E-UTRA) band has been specified in a technical specification (such as 3GPP Technical Specification (TS) 36.101, for example), the E-UTRA band generally cannot be changed, if user equipment (UE) development has started. The E-UTRA band generally cannot be changed because frequency bands are generally configured independent of 3GPP releases. For example, after 3GPP Release 11 has been frozen, it is generally not possible to make changes to 3GPP Release 11 and earlier frequency-band specifications.

It is generally not possible to make changes to 3GPP Release 11 and earlier frequency-band specifications because such changes could impact UE development, and such changes could render existing UEs incompatible with operating standards. Therefore, such changes are generally only made in special circumstances.

One example of a problematic frequency band is E-UTRA band 13, which is specified in 3GPP Release 8. E-UTRA band 13 is considered to be one of the biggest commercially-deployed LTE frequency bands. E-UTRA band 13 has millions of associated UEs.

An operator (such as an operator in the United States) that is operating in accordance with an operating license will generally only deploy a 10 MHz channel bandwidth. The 10 MHz channel can cover a complete available spectrum. The 10 MHz channel is not meant to address the defining of operating requirements for other LTE channel bandwidths. For a 10 MHz operation, a relatively complex power reduction scheme can be used in uplink in order to protect an adjacent public safety band.

In Canada, operators may use a same frequency range (such as a 10 MHz channel bandwidth) as the frequency range used in the United States. A configuration with two operators, using a 5 MHz channel bandwidth, appears to be a likely scenario for operators in Canada. Currently, if Canadian operators wish to allow UEs (using a legacy frequency band 13) to roam, the operators will risk interference to public safety users, because the UEs can exceed emission limits, as no power reduction is specified for a 5 MHz channel bandwidth.

Although frequency band 13 is one example of a problematic band, other problematic bands can exist. For example, frequency band 26 can be another example of a problematic band. Band 26 (which can be considered to be almost a global-roaming band) can experience similar problems as frequency band 13. As such, some new mechanisms may be needed.

According to the previous approaches, at least the following ways have been identified and proposed. A first example of the previous approaches includes relaxing an emission limit of the public safety band to a limit that is met with legacy UEs using a 5 MHz channel bandwidth. However, this first example does not guarantee sufficient protection, and there is no way for an operator to improve the situation if interference does occur.

A second example of the previous approaches includes using only "safe" resource allocations for a 5 MHz channel bandwidth. This second example does not cause harmful interference to public safety users, but can seriously cripple the spectrum, as described in Nokia contribution R4-124501.

A third example of the previous approaches can include changing a NS_07 related additional-maximum-power-reduction (A-MPR) specification to include a 5 MHz channel bandwidth, so that new UE implementations may use a tighter emission mask. This third example can be problematic because users may still need to perform UE conformance testing, and changing the specification means that some UEs will fail the conformance tests. Further, for a UE that is undergoing a test, it is not clear which A-MPR table the UE should follow. Some UEs would not know/recognize the new 5 MHz table.

A fourth example of the previous approaches can include changing the NS_07 related A-MPR specification from some release onwards (for example, 3GPP Release 12). This fourth example can break the 3GPP Release independency of band 13. However, there can also be ambiguity with regard to which 3GPP Release specification a UE should follow. For example, an operator might want to deploy UEs that operate in accordance with 3GPP Release 8 for feature phones for a long time, as these phones might not benefit from 3GPP Release 12 features.

A fifth example of the previous approaches can include creating a new frequency band specification for Canada, with sufficient specifications for public safety protection, and which use a broadcast (such as a "multiBandInfoList" broadcast) to indicate that an evolved Node B (eNB) operates both a new band and band 13. However, this fifth example can be problematic because, if band 13/NS_07 is signaled as a primary band (to allow roaming of legacy terminals which do not understand the multiBandInfoList), also the new terminals would camp in the network using band 13. Also, defining a new E-UTRA band can be a heavy process, which can duplicate a lot of information, and can multiply all carrier aggregation band combinations with the involved band.

In view of the above problems, in contrast with the previous approaches, one embodiment of the present invention uses broadcast system information to provide multiple NS values for a frequency band. One example of broadcast system information may comprise "multiBandInfoList" information.

A UE may receive the broadcast system information from System Information Blocks 1 and 2 (or any similar structure where a network indicates a cell to be a part of multiple frequency bands or to be a part of multiple emission requirements). Each frequency band indicator has a corresponding network signaling value. One embodiment uses a same frequency band indicator in the broadcast system information multiple times/instances. For example, one embodiment may use a same frequency band indicator in the multiBand- InfoList multiple times/instances. For each entry in the broadcast system information (such as multiBandInfoList) with a same band indicator, a separate network signaling (NS) value may be used. For example, each network-signaling value may correspond to a different emission requirement and/or A-MPR requirement.

In certain technical specifications (such as 3GPP Technical Specification 36.101, for example), multiple NS values for a given E-UTRA band may be specified. Specifying multiple NS values for bands may be done for many bands. However, currently, a UE would generally select the first NS value that is signaled.

One embodiment of the present invention may be used to add an NS value to a frequency band, which does not have an NS value to begin with, or update a band specification with a new NS value. One embodiment may also be used to provide the UEs with multiple NS values. In one embodiment, the UE may be mandated to choose the latest NS value. For example, the latest NS value may be the highest NS number that is broadcasted. In other embodiments, some other mechanism may define how the UE chooses an appropriate NS value from among a plurality of possible NS values. Using one embodiment of the present invention, all UEs would eventually migrate to using the latest NS values. Specifically, as more UEs are able to support new NS values, the old UEs would eventually go off-market.

In one embodiment of the present invention, the network may know which NS value a UE uses. For example, Nokia Proposal R4-131561 may be used to allow the network to know which NS value the UE uses. However, other embodiments may use other mechanisms to allow the network to know which NS value a UE uses. Each new NS value may be a new UE capability. As described in 3GPP TS 36.101, the capabilities may map to NS values and to A-MPR table versions.

Figure 1:
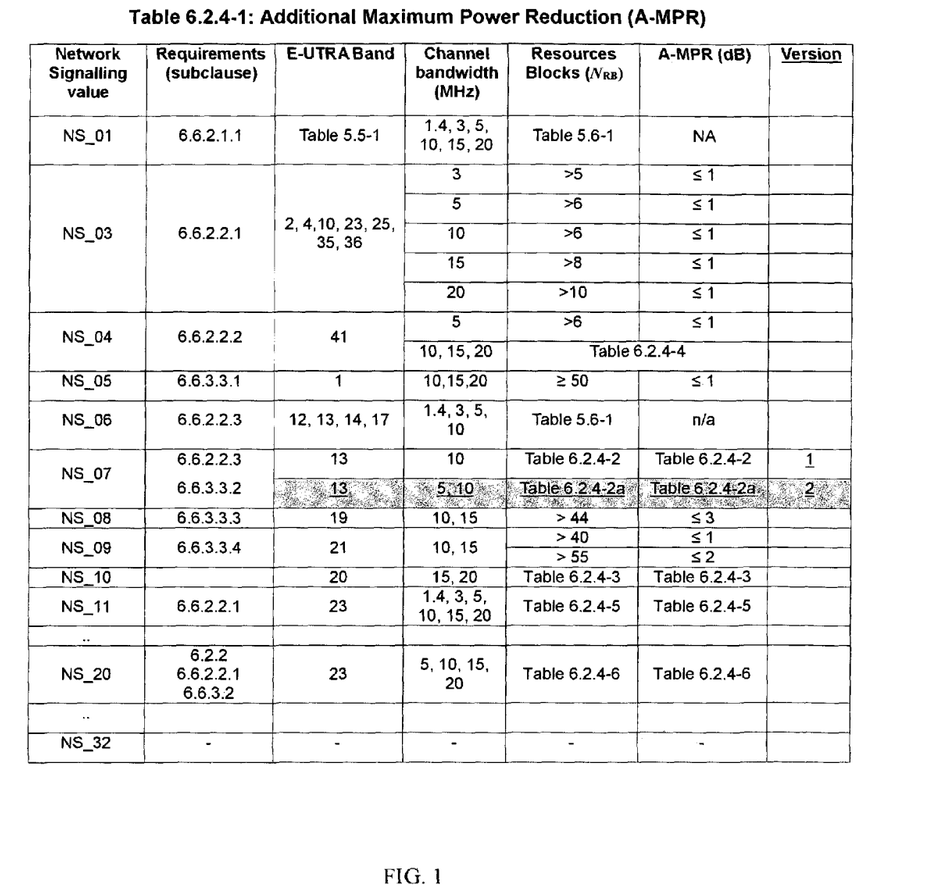
FIG. 1 illustrates different network-signaling values, which can be used in conjunction with one embodiment.

FIG. 1 illustrates different network-signaling values, which may be used in conjunction with one embodiment. In one embodiment of the present invention, a new NS-value may be added to table 6.2.4-1 of 3GPP TS 36.101 and corresponding points to appropriate location references. Also, one embodiment may enable UE capability to indicate support for the new NS value in the capability signaling.

In one embodiment of the present invention, a multiBand-Infolist network may indicate a same band multiple times, each time with different a NS value. A cell may be a part of multiple bands, and thus NW may indicate all the different bands multiple times. Indicating a same band multiple times ensures that legacy UEs will be able to still camp on a cell, even though an operator prefers the legacy UEs to camp with new emission requirements, if possible.

In one embodiment, if a same band number is indicated multiple times, a UE will camp on a newest NS value of those NS values that are supported by the UE.

In another embodiment, a UE may also optionally indicate that it supports a new NS-value. An NS value indicates additional emission requirements, and the additional emission requirements typically require the use of A-MPR. A base station scheduler generally will not be able to make optimized scheduling decisions, if the base scheduler does not know how much A-MPR the UE uses. For example, if the network does not know which NS value a UE supports, the network does not know the A-MPR usage.

In view of the above, with certain embodiments of the present invention, new NS values may be defined for existing frequency bands. This defining of new NS values allows for modification of the emission requirements. Defining new NS values also allows the defining of new NS values to gradually replace existing ones, to take into account, for example, improvements in UE performance. If the emission requirements remain the same, a new NS may be used to tighten the A-MPR definition.

Figure 2:
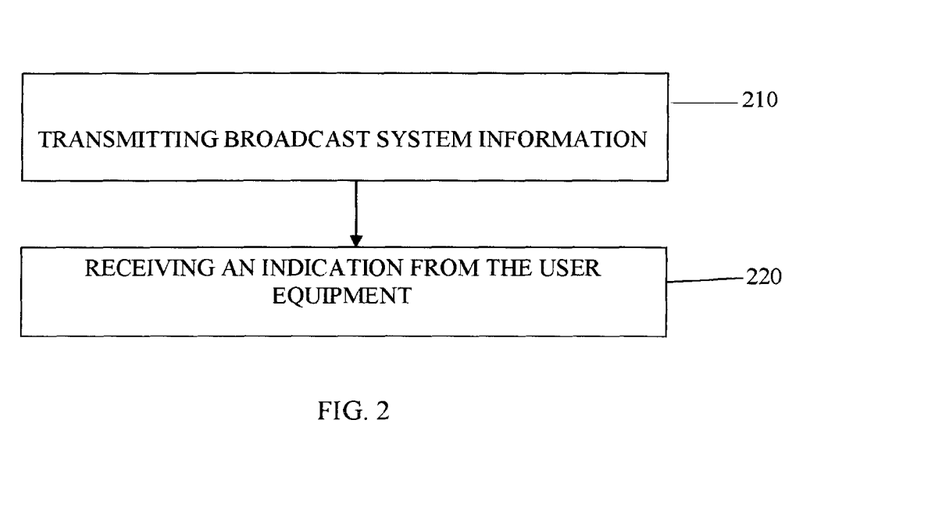
FIG. 2 illustrates a logic flow diagram of a method according to an embodiment.

FIG. 2 illustrates a logic flow diagram of a method according to an embodiment. The method illustrated in FIG. 2 includes, at 210, transmitting broadcast system information to a user equipment. The broadcast system information includes a frequency band indicator that is used for a plurality of instances. Each instance of the plurality of instances corresponds to a separate network-signaling value. Each network-signaling value corresponds to a different emission requirement. The method may also include, at 220, receiving an indication from the user equipment that the user equipment supports a network-signaling value.

Figure 3:
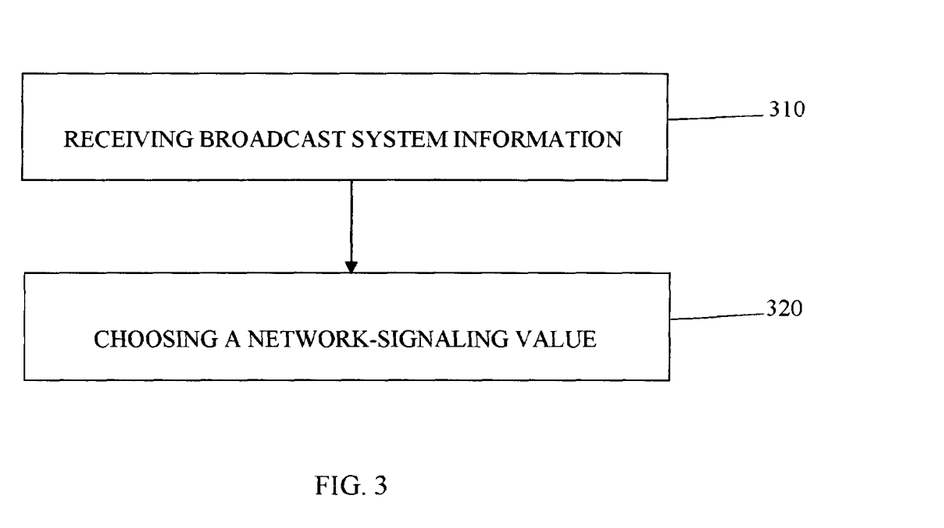
FIG. 3 illustrates a logic flow diagram of a method according to another embodiment.

FIG. 3 illustrates a logic flow diagram of a method according to another embodiment. The method illustrated in FIG. 3 includes, at 310, receiving, by a user equipment, broadcast system information. The broadcast system information includes a frequency band indicator that is used for a plurality of instances. Each instance of the plurality of instances corresponds to a separate network-signaling value. Each network-signaling value corresponds to a different emission requirement. The method may also include, at 320, choosing a network-signaling value.

Figure 4:
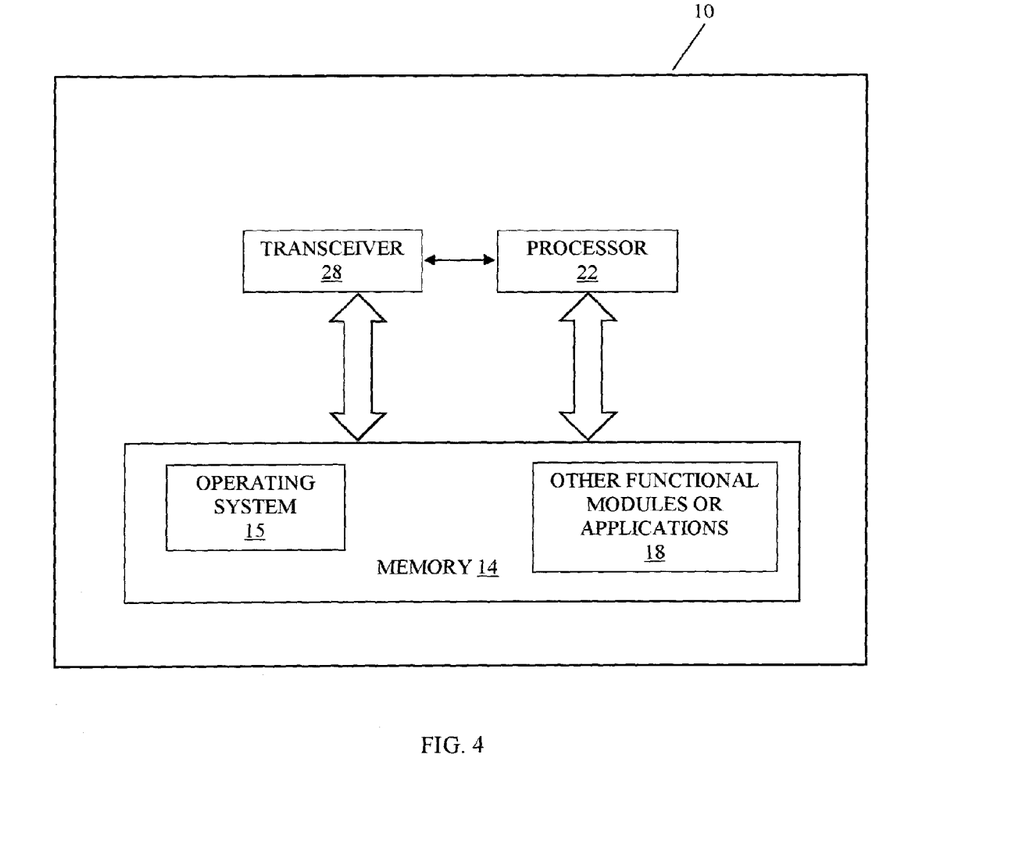
FIG. 4 illustrates an apparatus according to an embodiment.

FIG. 4 illustrates an apparatus 10 according to an embodiment. In an embodiment, apparatus 10 may be a receiving device, such as a UE, for example. In another embodiment, apparatus 10 may be a network element, such as a base station, for example.

Apparatus 10 may include a processor 22 for processing information and executing instructions or operations. Processor 22 may be any type of general or specific purpose processor. While a single processor 22 is shown in FIG. 4, multiple processors may be utilized according to other embodiments. Processor 22 may also include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

Apparatus 10 may further include a memory 14, coupled to processor 22, for storing information and instructions that may be executed by processor 22. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 14 may be comprised of any combination of random access memory (RAM), read only memory (ROM), static storage such as a magnetic or optical disk, or any other type of non-transitory machine or computer readable media. The instructions stored in memory 14 may include program instructions or computer program code that, when executed by processor 22, enable the apparatus 10 to perform tasks as described herein.

Apparatus 10 may also include one or more antennas (not shown) for transmitting and receiving signals and/or data to and from apparatus 10. Apparatus 10 may further include a transceiver 28 that modulates information on to a carrier waveform for transmission by the antenna(s) and demodulates information received via the antenna(s) for further processing by other elements of apparatus 10. In other embodiments, transceiver 28 may be capable of transmitting and receiving signals or data directly.

Processor 22 may perform functions associated with the operation of apparatus 10 including, without limitation, precoding of antenna gain/phase parameters, encoding and decoding of individual bits forming a communication message, formatting of information, and overall control of the apparatus 10, including processes related to management of communication resources.

In an embodiment, memory 14 stores software modules that provide functionality when executed by processor 22. The modules may include an operating system 15 that provides operating system functionality for apparatus 10. The memory may also store one or more functional modules 18, such as an application or program, to provide additional functionality for apparatus 10. The components of apparatus 10 may be implemented in hardware, or as any suitable combination of hardware and software.

Figure 5:
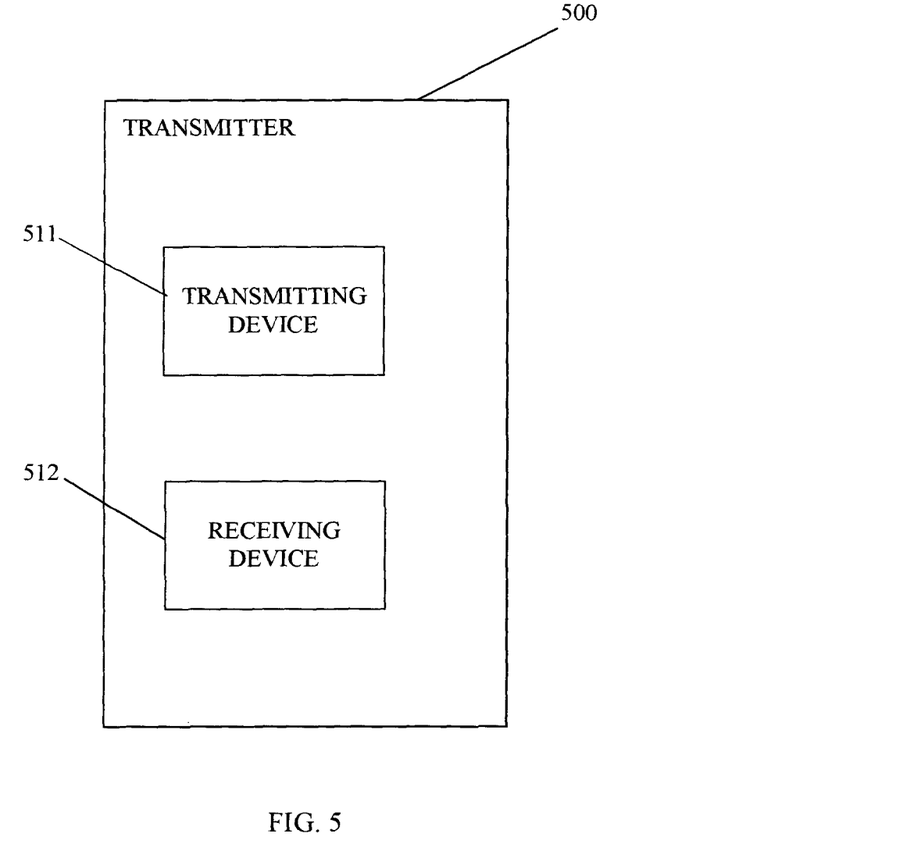
FIG. 5 illustrates an apparatus according to another embodiment.

FIG. 5 illustrates an apparatus 500 according to another embodiment. In an embodiment, apparatus 500 may be a transmitter. Apparatus 500 may include a transmitting device 511 that transmits broadcast system information to a user equipment. The broadcast system information comprises a frequency band indicator that may be used for a plurality of instances. Each instance of the plurality of instances corresponds to a separate network-signaling value. Apparatus 500 may also include a receiving device 512 that receives an indication from the user equipment that the user equipment supports a network-signaling value.

Figure 6:
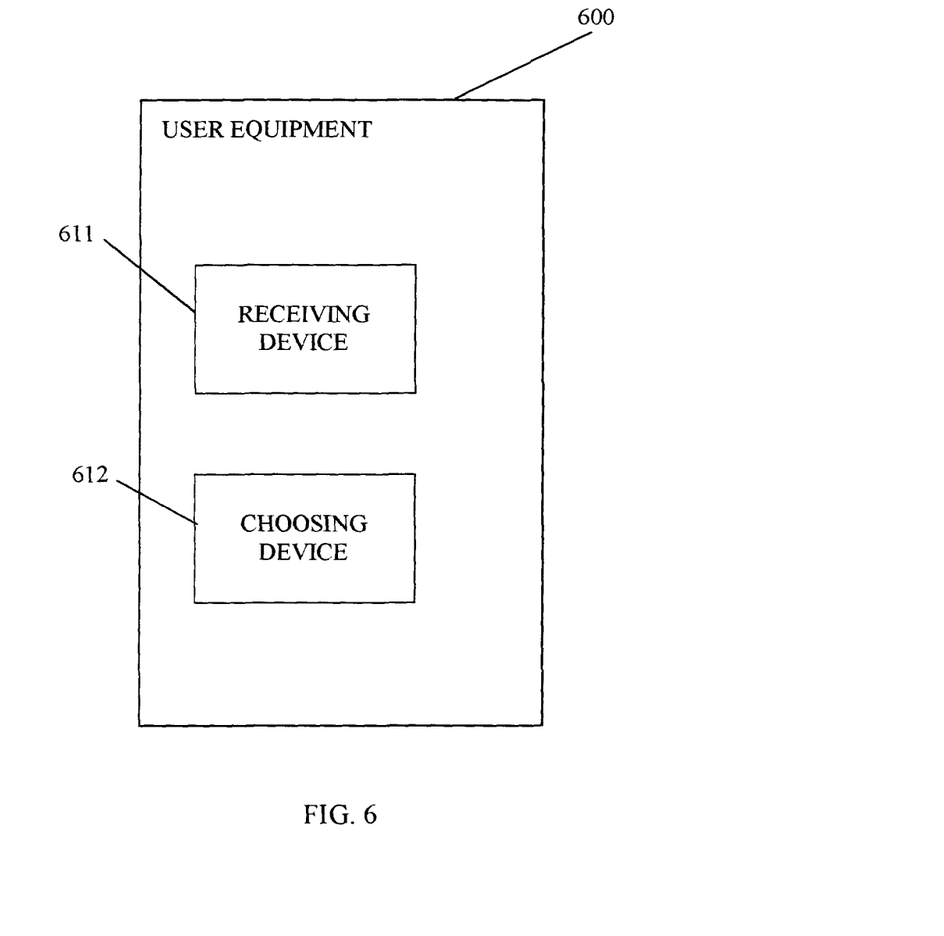
FIG. 6 illustrates an apparatus according to another embodiment.

FIG. 6 illustrates an apparatus 600 according to another embodiment. In an embodiment, apparatus 600 may be a user equipment. Apparatus 600 may include a receiving device 611 that receives broadcast system information. The broadcast system information comprises a frequency band indicator that is used for a plurality of instances. Each instance of the plurality of instances corresponds to a separate network-signaling value. Apparatus 600 may also include a choosing device 612 that chooses a network-signaling value.

The described features, advantages, and characteristics of the invention can be combined in any suitable manner in one or more embodiments. One skilled in the relevant art will recognize that the invention can be practiced without one or more of the specific features or advantages of a particular embodiment. In other instances, additional features and advantages can be recognized in certain embodiments that may not be present in all embodiments of the invention. One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

We claim:

1. A method, comprising:
transmitting broadcast system information to a user equipment, wherein the broadcast system information comprises a frequency band indicator that is used for a plurality of instances, wherein the plurality of instances corresponds to a plurality of separate network-signaling values, and wherein at least one of the plurality of separate network-signaling values corresponds to a frequency band without a previously defined network-signaling value; and
receiving an indication from the user equipment that the user equipment supports at least one of the plurality of network-signaling values corresponding to the frequency band without the previously defined network-signaling value.

2. The method according to claim 1, wherein each of the plurality of network-signaling values corresponds to a different requirement for an additional maximum power reduction.

3. The method according to claim 1, wherein the transmitting comprises using a system information block to transmit the broadcast system information.

4. The method according to claim 1, wherein each of the plurality of network-signaling values corresponds to a different requirement for an additional spectrum emission.

5. An apparatus, comprising:
at least one processor; and
at least one memory including computer program code,
the at least one memory and the computer program code are configured, with the at least one processor, to cause the apparatus at least to:
transmit broadcast system information to a user equipment, wherein the broadcast system information comprises a frequency band indicator that is used for a plurality of instances, wherein the plurality of instances corresponds to a plurality of separate network-signaling values, and wherein at least one of the plurality of separate network-signaling values corresponds to a frequency band without a previously defined network-signaling value; and
receive an indication from the user equipment that the user equipment supports at least one of the plurality of network-signaling values corresponding to the frequency band without the previously defined network-signaling value.

6. The apparatus according to claim 5, wherein each of the plurality of network-signaling values corresponds to a different requirement for an additional maximum power reduction.

7. The apparatus according to claim 5, wherein the transmitting comprises using a system information block to transmit the broadcast system information.

8. The apparatus according to claim 5, wherein each of the plurality of network-signaling values corresponds to a different requirement for an additional spectrum emission.

9. A method, comprising:
receiving, at a user equipment, broadcast system information, wherein the broadcast system information comprises a frequency band indicator that is used for a plurality of instances, wherein the plurality of instances corresponds to a plurality of separate network-signaling values, and wherein at least one of the plurality of separate network-signaling values corresponds to a frequency band without a previously defined network-signaling value; and
transmitting an indication that the user equipment supports at least one of the plurality of network-signaling values corresponding to the frequency band without the previously defined network-signaling value.

10. The method according to claim 9, wherein each of the plurality of network-signaling values corresponds to a different requirement for an additional maximum power reduction.

11. The method according to claim 9, further comprising choosing at the user equipment one of the plurality of network-signaling values.

12. The method according to claim 11, wherein the choosing comprises choosing one of the plurality of network-signaling values with a highest value.

13. The method according to claim 9, wherein the receiving comprises receiving the broadcast system information via a transmitted system information block.

14. The method according to claim 9, wherein each of the plurality of network-signaling values corresponds to a different requirement for an additional spectrum emission.

15. An apparatus, comprising:
at least one processor; and
at least one memory including computer program code,
the at least one memory and the computer program code are configured, with the at least one processor, to cause the apparatus at least to:
receive, at a user equipment, broadcast system information, wherein the broadcast system information comprises a frequency band indicator that is used for a plurality of instances, wherein the plurality of instances corresponds to a plurality of separate network-signaling values, and wherein at least one of the plurality of separate network-signaling values corresponds to a frequency band without a previously defined network-signaling value; and
transmit an indication that the user equipment supports at least one of the plurality of network-signaling values corresponding to the frequency band without the previously defined network-signaling value.

16. The apparatus according to claim 15, wherein each one of the plurality network-signaling values corresponds to a different requirement for an additional maximum power reduction.

17. The apparatus according to claim 15, wherein the apparatus is further caused to choose one of the plurality of network-signaling values.

18. The apparatus according to claim 17, wherein the choosing comprises choosing the plurality of network-signaling values with a highest value.

19. The apparatus according to claim 15, wherein the receiving comprises receiving broadcast system information via a transmitted system information block.

20. The apparatus according to claim 15, wherein each of the plurality of network-signaling values corresponds to a different requirement for an additional spectrum emission.

* * * * *